United States Patent [19]
Fujinaka et al.

[11] 4,272,225
[45] Jun. 9, 1981

[54] ELECTROMAGNETICALLY-OPERATED FIXED DISPLACEMENT PUMP

[75] Inventors: Yoshiaki Fujinaka, Tokyo; Haruo Ohashi, Kawagoe; Masahito Miyazaki, Fujimi; Kenzi Mizuno, Tokorozawa; Fukuzi Kuwabara, Fujimi, all of Japan

[73] Assignee: Iwaki Co., Ltd., Tokyo, Japan

[21] Appl. No.: 25,550

[22] Filed: Mar. 30, 1979

[30] Foreign Application Priority Data

Apr. 8, 1978 [JP] Japan .................................. 53-41578

[51] Int. Cl.³ ............................................. F04B 17/04
[52] U.S. Cl. ............................................. 417/417; 92/8; 92/160; 310/317
[58] Field of Search ............... 417/417; 335/260, 257; 310/15, 17; 92/158, 160, 8, 85 B

[56] References Cited
U.S. PATENT DOCUMENTS

| | | | |
|---|---|---|---|
| 1,772,104 | 8/1930 | Marien | 92/160 |
| 1,888,250 | 11/1932 | Tice | 417/417 |
| 2,721,024 | 10/1955 | Zeh | 417/417 |
| 2,935,663 | 5/1960 | Pollak | 335/260 X |
| 3,045,606 | 7/1962 | Schmidt | 92/158 X |
| 3,877,841 | 4/1975 | Nakamura | 417/417 X |
| 3,958,902 | 5/1976 | Toyoda et al. | 417/417 X |
| 4,021,152 | 5/1977 | Toyoda | 417/417 |

*Primary Examiner*—Leonard E. Smith
*Attorney, Agent, or Firm*—Frishauf, Holtz, Goodman and Woodward

[57] ABSTRACT

In an electromagnetically-operated fixed displacement pump, a lubricating oil storage tank and a communicating hole with one end opening upon the bottom of the tank are formed in a pump body, the other end of the hole in the pump body communicating with one end of another communicating hole extending through a movable armature in the axial direction thereof, the other end of the communicating hole in the armature opening into an electromagnetic gap between a fixed armature and the movable armature.

11 Claims, 2 Drawing Figures

ELECTROMAGNETICALLY-OPERATED FIXED DISPLACEMENT PUMP

BACKGROUND OF THE INVENTION

This invention relates generally to an electromagnetically-operated reciprocating pump to operate by means of a solenoid, and more specifically to lubrication of an electromagnetic gap between movable and fixed armatures as well as a sliding region of the movable armature in such pump.

Recently, pumps of the aforesaid type, which are driven by the driving force of a solenoid, have come to enjoy general use.

Heretofore, none of the pumps of this type has been provided with means for the positive lubrication of the sliding region of the movable armature or sliding surfaces including the outer peripheral surface of the cylindrical armature and the inner peripheral wall surface of a solenoid cylinder bore, the electromagnetic gap region between the fixed and movable armatures, and a sliding region of an intermediate member slidably disposed in a pump body and changing the pump house capacity in response to the operation of the movable armature. Such lubrication should provide cooling of those varied sliding regions as well.

Accordingly, the prior art pumps are subject to the following defects. That is, when the movable armature is attracted by the fixed armature and when the movable armature is returned by a return spring, noises and vibrations would be caused by collisions between the two armatures as well as between the movable armature and some other member. Further, in connection with this, the impact surfaces and sliding surfaces of the members should wear substantially. Since the coil temperature increases while a solenoid coil is being energized, and the solenoid coil may not positively be cooled, an excessive rise in temperature would be caused. Owing to these various factors, the conventional electromagnetically-operated pumps would not be able to perform stable electromagnetic operation, and their operating accuracy would deteriorate.

Furthermore, there is no pump of this type that includes any provision for positive and effective lubrication of an intermediate region including the intermediate member. In many cases, the intermediate region is not provided with even a means for slidingly guiding the intermediate member. Therefore, no stable reciprocating operation can be expected of such a construction.

Thus, it is impossible to obtain steady pump discharge efficiency, constituting a great obstacle to the proper operation of such fixed displacement pump, in particular.

SUMMARY OF THE INVENTION

Accordingly, an object of this invention is to provide an electromagnetically-operated fixed displacement pump capable of positive lubrication of the solenoid and intermediate regions under good conditions, thereby cooling these regions, softening noises that may be caused when a movable armature runs against a fixed armature and other members, and minimizing abrasion of sliding parts, and, as well checking a rise in temperature of a solenoid coil for stable operation.

In order to attain the above objects, an oil storage tank formed is in a body, and communicating means is provided for introducing lubricating oil in the tank into an electromagnetic gap between two armatures.

The communicating means includes, for example, a circulation hole extending through the movable armature along the axial direction thereof, one end of the hole opening into the electromagnetic gap. The other end of the axial communicating hole of the armature communicates with a liquid takeoff hole in the bottom of the tank.

According to an alternative construction, the axial communicating hole extends through the fixed armature, with one end communicating with the liquid takeoff hole in the bottom of the tank and the other end opening into the electromagnetic gap. Further, the movable armature is provided with a plurality of circular holes formed therein along the axial direction in close vicinity to the outer periphery thereof.

Moreover, a plurality of liquid grooves are formed on the outer peripheral surface of a cylindrical intermediate member capable of sliding in a slide bore in the body, so that the lubricating fluid from the tank may be introduced into the grooves. Where a spring chamber to contain a return spring is defined between the outer peripheral surface of the intermediate member and the inner peripheral wall surface of the slide bore, a plurality of circulation holes are formed along the axial direction, so that one end of each such hole opens into the chamber and that the other end may receive the lubricating fluid from the storage tank, whereby the lubricating fluid will be supplied to the spring chamber.

DETAILED DESCRIPTION OF THE PREFERRED EMBODIMENTS

Figure 1:
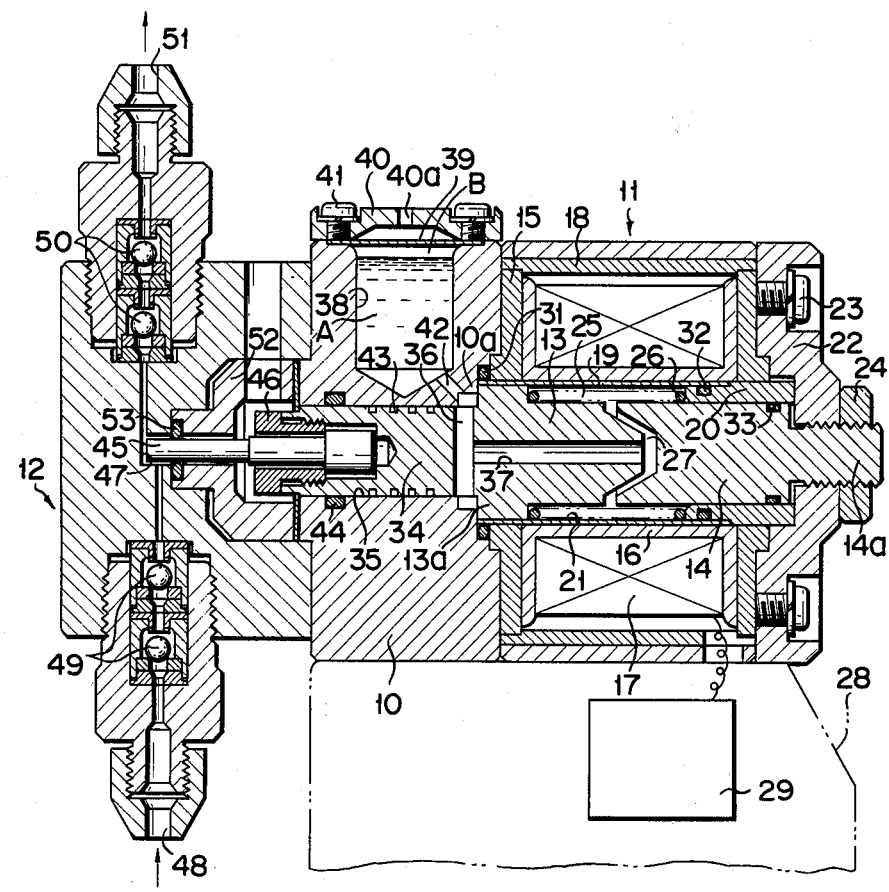
FIG. 1 is a sectional view of a first embodiment of the electromagnetically-operated fixed displacement pump according to this invention as taken along its axis.

A first embodiment of this invention as shown in FIG. 1 is an electromagnetically-operated fixed displacement plunger pump with what is called a pull-type solenoid. In the center of the pump as illustrated is a body 10, on the right and left sides of which a solenoid assembly 11 and a pump head assembly 12 are disposed, respectively. The solenoid assembly 11 includes cylindrical movable and fixed armatures 13 and 14 in the center thereof, a yoke 15 surrounding the outer peripheries of these armatures, a bobbin 16, and a solenoid coil 17 wound on the bobbin 16, all these members being contained in a solenoid casing 18.

Fitted in the bobbin 16 is a thin guide cylinder 19 for the movable armature 13. On the right side of the cylinder 19 is a bush 20 disposed coaxially therewith, in which the fixed armature 14 is fitted. The guide cylinder 19 defines a solenoid bore 21 therein, whereby the movable armature 13 is guided so as to slide longitudinally along the axis.

The right side portion of the solenoid assembly 11 is fitted with a side plate 22. A plurality of bolts 23 are screwed into the body 10 to extend from the side plate 22 through the solenoid assembly 11, thereby allowing the solenoid assembly 11, as a unit, to be attached to and detached from the body 10.

A rightward extended portion 14a of the fixed armature 14 extends through the side plate 22, fixed to the side plate 22 by means of a lock nut 24. By the nut 24, the fixed armature 14 is held in an adjusted position in the axial direction.

A spring chamber 25 is defined between the respective outer peripheral surfaces of the movable and fixed armatures 13 and 14 and the inner peripheral surface of the guide cylinder 19, the chamber 25 containing a return coil spring 26 therein. The right end of the spring 26 engages the end face of the bush 20, while the left end is touched by the right end face of an extended-diameter portion 13a of the movable armature 13. The movable armature 13, which is urged to the left by the spring 26, is held against such urging effect in such a position (original position) as shown in FIG. 1 where the left end face of the extended-diameter portion 13a abuts a shoulder portion 10a of the body 10. When the movable armature 13 is in the original position, an electromagnetic gap 27 defined between the reciprocally facing sides of the armatures 13 and 14 is maximized. When the solenoid coil 17 is excited by an electric control circuit 29 in a pump base 28 indicated by chain lines, the movable armature 13 axially leaves the original position and slides against the spring 26 to the right to be attracted to the fixed armature 14. In such attracted state, the gap 27 is substantially eliminated. The facing side of the movable armature to the fixed armature protrudes in the shape of a truncated cone, while the facing side of the fixed armature is recessed in the same shape so as to complement the protrusion.

Seal rings 31, 32 and 33 for liquid-tightness, as illustrated, are fixed on the left end portion of the outer periphery of the guide cylinder 19 between the shoulder portion 10a and the yoke 15, between the bush 20 and the guide cylinder, and between the bush 20 and the fixed armature 14, respectively.

An intermediate member 34 integrated with the movable armature 13 is slidably inserted in a bore 35 coaxial with the solenoid bore 21. A circulation hole 36 extends across the intermediate portion of the integral body composed of the movable armature 13 and the intermediate member 34. This hole 36 is just located at the right end of the body bore 35 when the movable armature 13 is in the original position. Into the hole 36 opens the left end of a circulation hole 37 axially extending through the center of the movable armature 13. The right end of the axial hole 37 opens into the electromagnetic gap 27. On the top of the body 10 is an open-top lubricating oil storage tank 38 filled with lubricant (A). The top opening of the tank 38 is hermetically sealed with a diaphragm 39, thereby isolating the lubricant from the open air. Above the diaphragm 39 is a cover 40 with a breathing hole 40a fixed together with the diaphragm to the body 10 by means of bolts 41. A layer (B) of some air is preserved between the diaphragm 39 and the surface of the lubricant.

At the bottom of the tank 38, a circulation hole 42 for the takeoff of the lubricant is formed in the body 10. The hole 42 has its top and bottom ends of the hole 42 open into the bottom portion of the tank 38 and the body bore 35 respectively, communicating with the cross circulation bore 36.

The lubricant filling the tank 38 preferably provides superior shock absorbing capability, as well as good lubricity and cooling effect. Generally available for such lubricant are, for example, mineral oil, insulating oil and silicone oil, or even water.

In the outer peripheral surface of the intermediate member 34 are a plurality of liquid grooves 43 formed along the circumferential direction. These liquid grooves are pooled with the lubricant (A) that has penetrated into the gap between the outer peripheral surface of the member 34 and the inner wall surface of the body bore 35. At the left end portion of the intermediate member 34 is a seal ring 44 disposed between the outer peripheral surface of the member 34 and the body 10, whereby the lubricant is prevented from leaking through in the leftward direction.

At the left end portion of the intermediate member 35 is a pump plunger 45 fixed coaxially on the intermediate member 34 by means of a fixing nut 46. The leftward free end of the plunger 45 is thrusted into a pump house 47 defined in the center of the pump head assembly 12.

A fluid to be pumped is introduced into the pump head assembly 12 through an inlet 48 at the bottom, entering the pump house 47 through a check valve 49 in a valve casing. The fluid held in the pump house 47 is forced out from the pump house with every reciprocation of the plunger 45, and discharged from an outlet 51 through a check valve 50 in another valve casing. The right-side region of the pump house 47 is sealed up with a seal ring 53 between the outer peripheral surface of the plunger 45 and a gland ring 52.

The lubricant (A) in the storage tank 38 is supplied to the electromagnetic gap 27 and further to the spring chamber 25 by means of the circulation holes 42, 36 and 37. The lubricant is kept by the seal rings 31, 32 and 33 from leaking out through the solenoid bore 21. In the region of the intermediate member 34, the lubricant (A) enters the liquid grooves 43 from the cross circulation bore 36 through the gap between the outer peripheral surface of the intermediate member and the inner peripheral surface of the body bore, as mentioned before. However, the seal ring 44 prevents the lubricant from leaking in the leftward direction.

When the solenoid coil 17 is excited, the movable armature 13, together with the intermediate member 34 and the plunger 35, moves to the right, so that the fluid to be supplied is sucked into the pump house 47. When the coil 17 is released from excitation, the movable armature 13 is returned by the action of the spring 26, and the plunger 45 runs into the pump house 47, thereby forcing out the fluid in the pump house 47 therefrom.

Thus, the fluid in the pump house 47 is pumped by regular displacements by the reciprocation of the movable armature 13.

While the movable armature 13 is being attracted and returned, the lubricant (A) tends to soften any drastic action of the armature 13. That is, when the movable armature 13 is attracted to the fixed armature 14, the lubricant in the electromagnetic gap 27 is pushed out to flow leftward through the axial circulation hole 37, and comes out into the cross hole 36. Thereafter, part of the lubricant enters a space between the shoulder portion 10a and the extended-diameter portion 13a, while the remainder flows back into the tank 38 through the hole 42. When the movable armature 13 is returned, on the other hand, the lubricant held between the shoulder portion 10a and the extended-diameter portion 13a enters the axial hole 37 through the cross hole 36, and then flows toward the electromagnetic gap 27. At the same time, part of the lubricant flows into the tank 38.

Accordingly, in reciprocating the movable armature 13, any impulsive motion of the armature 13 may be softened by the passage of the lubricant through the axial circulation hole 37 in the movable armature 13. Thus, any noises or vibrations that may be produced when the movable armature 13 runs against the fixed armature 14 or when the extended-diameter portion 13a strikes into the shoulder portion 10a, as well as abrasion of the impact surfaces of the related members, may be minimized. Also, noises from the return spring 26 can be reduced by the lubricant in the spring chamber 25. Naturally, the lubricant penetrates throughout the length and breadth of the sliding surfaces of the movable armature 13 and the intermediate member 34 that slide, for satisfactory lubrication and also for cooling of the sliding surface regions. Thus, generation of heat and abrasion, which may otherwise be caused at time of reciprocation of the movable armature 13 and the intermediate member 34, will be able to be avoided. Moreover, the lubricant introduced into the solenoid bore 21 will cause the solenoid coil 17 to radiate the produced heat guide efficiently. Therefore, it is unnecessary to provide any special radiating section, which enables reduction of the solenoid assembly in size.

Furthermore, although the pressure inside the tank 38 fluctuates with every entrance and exit of the lubricant while the movable armature 13 is reciprocating, such fluctuations may be absorbed by the air layer (B) and the diaphragm 39. The flow of the lubricant, therefore, is highly stable, so that the pump operation, as well as the operation of the movable armature 13, is duly stabilized.

Accompanying the reciprocation of the movable armature 13, the lubricant, which has absorbed heat in the solenoid bore 21 to increase its temperature, comes out from the bore 21 at the time of attraction. Then, part of such lubricant flows via the circulation holes 37, 36 and 42 into the tank 38, where it radiates heat satisfactorily, thereby achieving stable cooling by means of the lubricant.

Also in the region of the intermediate member 34, the sliding surface of the intermediate member 34 may enjoy good lubrication and cooling especially due to the lubricant's entering the liquid grooves.

Figure 2:
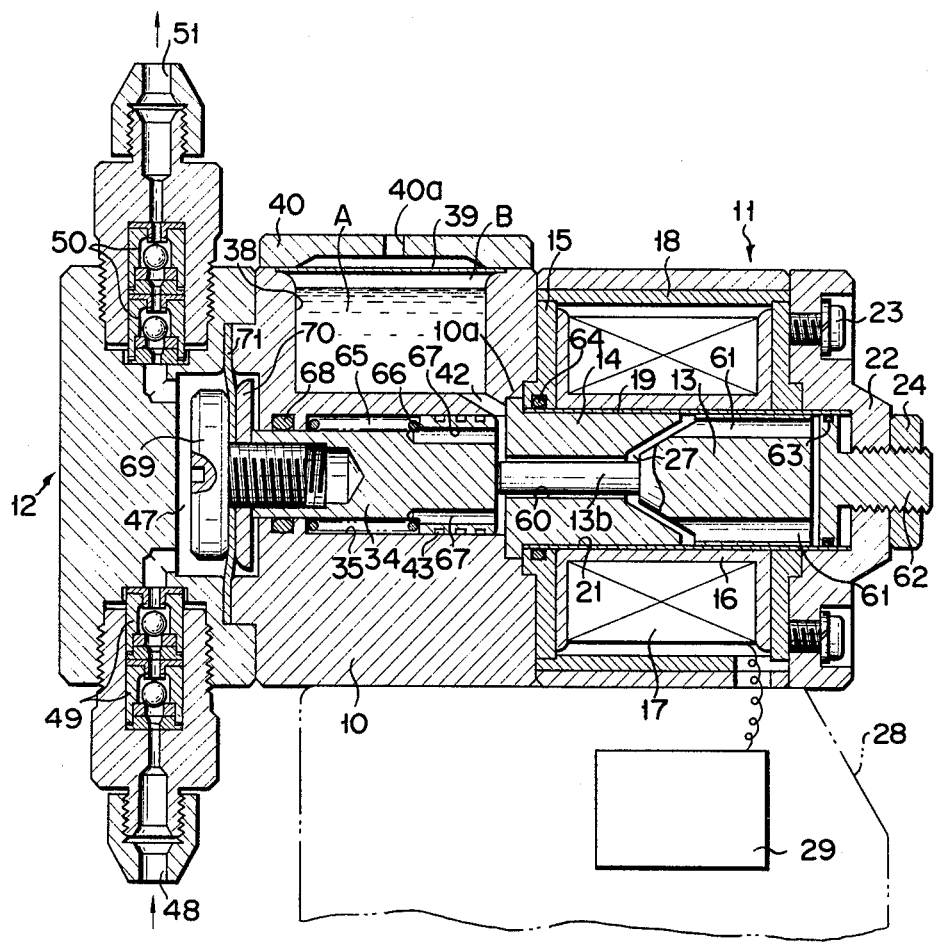
FIG. 2 is a sectional view of a second embodiment of the electromagnetically-operated fixed displacement pump as taken along its axis.

A second embodiment of this invention as shown in FIG. 2 is an electromagnetically-operated fixed displacement diaphragm pump with what is called a push-type solenoid. Among the members or parts of this pump, those which function like the ones included in the first embodiment as shown in FIG. 1 are denoted by like reference numerals, and description of such members will be omitted.

This embodiment differs from the first embodiment in that an intermediate member 34 and a movable armature 13 are formed separately. Motion is transmitted from the end of an extension rod 13b of the movable armature 13 to the intermediate member 34.

The rod 13b of the movable armature 13 is loosely inserted in a circulation hole 60 formed in the center of a fixed armature 14 along the axis thereof. One end of the circulation hole 60 opens an electromagnetic gap 27, while the other opens to the intermediate member side. In the vicinity of the outer periphery of the movable armature 13, which can slide inside a solenoid bore 21 in a guide cylinder 19, there are a plurality of circulation holes 61 extending along the axial direction. One end of each such circulation hole opens into the electromagnetic gap 27, while the other opens onto the right end face of the movable armature. A stopper member 62 is so disposed as to face the right end face of the movable armature 13. The extended portion of the member 62, which extends outward through a side plate 22, is fitted with a lock nut 24. By the nut 24, the stopper member 62 is fixed and held in an adjusted position. A seal ring 63 is disposed between the extended-diameter portion of the stopper member 62 and the inner peripheral surface of the guide cylinder 19, while a seal ring 64 is interposed between the guide cylinder and a yoke 15.

Lubricant (A) in a lubricant storage tank 38 formed in a body 10 is introduced into a space between the intermediate member 34 and the fixed armature 14 inside a body bore 35 by means of a takeoff hole 42 in the body 10. Then, the lubricant is led to the electromagnetic gap 27 through the axial bore 60 in the fixed armature 14, and further to the stopper member side via the circulation holes 61 in the movable armature 13.

A plurality of liquid grooves 43 are formed in the outer peripheral surface of the intermediate member 34 capable of sliding in the body bore 35. Defined between the outer peripheral surface of the member 34 and the inner peripheral surface of the bore 35 is a spring chamber 65, which contains a return spring 66 therein. Formed in the intermediate member are a plurality of circulation holes 67 each having one end opening onto the right end of the spring chamber 65 and the other end opening upon the forward end face of the intermediate member. The holes 67 are axially formed in the vicinity of the outer peripheral surface of the intermediate member 34. The lubricant may, therefore, be supplied also to the spring chamber 65 by means of these circulation holes 67. A seal ring 68 keeps the lubricant from leaking from between the intermediate member 34 and the body bore 35.

A diaphragm retaining member 69 is screwed into the left end portion of the intermediate member 34, and a diaphragm 71 held between the member 69 and a retainer 70 covers up one side of a pump house 47 tight. The diaphragm 71 is operated by means of the action of the movable armature 13 transmitted through the intermediate member, thereby forcing out by regular displacements a fluid in the pump house 47 which is to be supplied.

In the above-mentioned second embodiment, like the first embodiment, the lubricant flows, in response to the operation of the movable armature 13, through the electromagnetic gap 27 and the axial circulation holes 60 and 61 in the solenoid bore 21, as well as through the spring chamber 65 and the axial circulation hole 67 in the body bore 35. Thus, noises and vibrations, as well as abrasion of the members, may be minimized, if any, and generated heat may efficiently be absorbed to provide stable pump operation.

With these embodiment, the tank 38 may be provided not only in the body 10, but also anywhere else. For example, the tank can be set on the side of the side plate 22. This arrangement is obvious to those skilled in the art, though it is not shown herein.

What we claim is:

1. An electromagnetically operated fixed displacement pump comprising:
    a body having a bore therein;
    a pump head assembly attached to said body and including an inlet, an outlet, valve means and a pump house to contain a pumped fluid;
    a solenoid assembly including a solenoid coil surrounding a cylindrical bore, a movable armature slidably disposed in said cylindrical bore surrounded by said coil, return spring for urging the movable armature in one axial direction, stop means for normally holding the movable armature against the biasing force of said return spring in a normal position, a fixed armature axially facing said movable armature and fixedly positioned in said cylindrical bore, said movable armature defining a maximum electromagnetic gap with the fixed armature when the movable armature is in a normal position, and an annular spring chamber for containing the return spring, said annular spring chamber being defined in the said cylindrical bore surrounded by said coil over the outer peripheries of said two armatures;

an intermediate axially and slideably disposed in said bore of said body and being integral with said movable armature for changing the capacity of the pump house in response to the sliding movement of the movable armature, thereby forcing out by regular displacements the fluid to be pumped from said pump house, said intermediate member and said movable armature together forming an integral body;

a storage tank mounted in said body for containing a lubricating fluid;

a cross circulation hole mounted across the intermediate portion of said integral body formed of said movable armature and said intermediate member;

fluid communication means for communicating the fluid in said tank with said cross circulation hole; and an axial circulation hole axially formed in said movable armature and opening at one end into said electromagnetic gap and at the other end into said cross circulation hole.

2. An electromagnetically-operated fixed displacement pump according to claim 1 wherein said cross circulation hole is mounted cross-wise substantially at the middle portion of said integral body.

3. An electomagnetically-operated fixed displacement pump according to claim 1, wherein said fluid communication means includes a further circulation hole in said body, one end of which opens into the bottom portion of said lubricating fluid storage tank.

4. An electromagnetically-operated fixed displacement pump according to claim 1, wherein said lubricating fluid storage tank includes a diaphragm for sealing said storage tank.

5. An electromagnetically-operated fixed displacement pump according to claim 1, comprising a plurality of circumferential liquid grooves on the outer periphery of said intermediate member, said lubricating fluid flowing into said grooves from said cross circulation hole through a space between the outer peripheral surface of said intermediate member and the inner peripheral surface of bore of said body in which said intermediate member is disposed.

6. An electromagnetically-operated fixed displacement pump according to claim 1, further comprising a plurality of circulation holes each having one end opening into said electromagnetic gap and formed along the axial direction in close vicinity to the outer peripheral surface of said movable armature; and said movable armature has a rod loosely inserted in said axially circulation hole in said fixed armature.

7. An electromagnetically operated fixed displacement pump comprising:

a body having a bore therein;

a pump head assembly attached to said body and including an inlet, an outlet, valve means and a pump house to contain a pumped fluid;

a solenoid assembly including a solenoid coil surrounding a cylindrical bore, a movable armature slidably disposed in said cylindrical bore surrounded by said coil, a return spring for urging the moveable armature in one axial direction, stop means for normally holding the movable armature against the biasing force of said return spring in a normal position, a fixed armature facing said movable armature and fixedly positioned in said cylindrical bore, said movable armature defining a maximum electromagnetic gap with the fixed armature when the movable armature is in the normal position;

an intermediate member slideably disposed in said bore of said body for changing the capacity of said pump house in response to the sliding movement of said movable armature, thereby forcing out by regular displacements the fluid to be pumped from said pump house;

means for connecting said intermediate member together with said movable armature, when said movable armature moves from the normal position;

a storage tank mounted in said body for containing a lubricating fluid;

fluid communication means for leading the lubricating fluid in said tank to the electromagnetic gap between said two armatures;

an annular spring chamber for containing said return spring, said annular spring chamber being defined in said bore of said body which is around the outer peripheral surface of said intermediate member; and a plurality of circulation holes formed in the axial direction of said intermediate member and in close proximity to the outer peripheral surface of said intermediate member, one end of each said circulation hole opening into said annular spring chamber, and the other end connecting with said fluid communication means.

8. An electromagnetically operated fixed displacement pump according to claim 7, wherein said fluid communication means includes a space between said intermediate member and said fixed armature; a takeoff hole formed in said body for communicating the tank with said space; and an axial circulation hole formed in said fixed armature, said axial circulation hole opening at one end into said space and at the other end into said electromagnetic gap.

9. An electromagnetically operated fixed displacement pump according to claim 8 wherein said connecting means includes a rod integrally formed with said movable armature and loosely inserted in said axial circulation hole.

10. An electromagnetically operated fixed displacement pump according to claim 7, wherein said lubricating fluid storage tank includes a diaphragm for sealing said storage tank.

11. An electromagnetically operated fixed displacement pump according to claim 7, comprising a plurality of circumferential liquid grooves on the outer periphery of said intermediate member, and means for communicating said lubricating fluid to said grooves.

* * * * *

UNITED STATES PATENT AND TRADEMARK OFFICE
CERTIFICATE OF CORRECTION

PATENT NO. : 4,272,225
DATED : June 9, 1981
INVENTOR(S) : Yoshiaki FUJINAKA et al It is certified that error appears in the above—identified patent and that said Letters Patent is hereby corrected as shown below:

COLUMN 6 (claim 1), line 65, after "rounded by said coil,"

insert --a--;

COLUMN 7 (claim 1), line 11, after "an intermediate" insert

--member--.

Signed and Sealed this

Eighth Day of December 1981

[SEAL]

Attest:

Attesting Officer

GERALD J. MOSSINGHOFF
Commissioner of Patents and Trademarks